(12) United States Patent
Zydron

(10) Patent No.: US 7,293,341 B2
(45) Date of Patent: Nov. 13, 2007

(54) COLLAPSIBLE CORE ASSEMBLY FOR A MOLDING APPARATUS

(75) Inventor: Garry Zydron, Romeoville, IL (US)

(73) Assignee: Progressive Components International Corporation, Waveonda, IL (US)

( * ) Notice: Subject to any disclaimer, the term of this patent is extended or adjusted under 35 U.S.C. 154(b) by 0 days.

(21) Appl. No.: 11/143,528

(22) Filed: Jun. 2, 2005

(65) Prior Publication Data

US 2006/0188602 A1 Aug. 24, 2006

Related U.S. Application Data

(63) Continuation-in-part of application No. 10/906,413, filed on Feb. 18, 2005, now abandoned.

(51) Int. Cl.
*B23P 11/02* (2006.01)
*B21D 39/00* (2006.01)

(52) U.S. Cl. .......... 29/450; 29/522.1; 425/438; 425/577

(58) Field of Classification Search .......... 29/522.1, 29/450; 425/438, 437, 436 R, 577; 249/175–180, 249/184
See application file for complete search history.

(56) References Cited

U.S. PATENT DOCUMENTS

| 3,247,548 A | 4/1966 | Fields |
| 3,632,264 A | 1/1972 | Butcher |
| 3,655,323 A | 4/1972 | Hall |
| 4,021,180 A | 5/1977 | Smith |
| 4,286,766 A | 9/1981 | von Holdt |
| 4,533,312 A | 8/1985 | VonHoldt |
| 4,618,121 A | 10/1986 | Conti |
| 4,627,810 A | 12/1986 | VonHoldt |
| 4,861,257 A * | 8/1989 | Siotani ............ 425/438 |
| 4,919,608 A | 4/1990 | Catalonotti |
| 4,938,679 A | 7/1990 | Pietrorazio |
| 6,506,330 B1 | 1/2003 | Schweigert |
| 2006/0061009 A1 * | 3/2006 | Clack ............ 264/259 |

* cited by examiner

*Primary Examiner*—David P. Bryant
*Assistant Examiner*—Christopher M Koehler

(57) ABSTRACT

A collapsible core device for molding articles around the core device in a mold cavity includes a first sleeve, a second sleeve and an expansion member. The first sleeve includes a plurality of first ribs extending from a first base in an axial direction and defining a discontinuous first perimeter surrounding a channel. The second sleeve includes a plurality of second ribs extending from a second base in an axial direction and defining a discontinuous second perimeter surrounding the central channel. Each of the second ribs is arranged between adjacent ones of the first ribs. The expansion member is fittable within the central channel to displace the first and second ribs outwardly to form an overall perimeter defined by the first and second ribs.

15 Claims, 5 Drawing Sheets

COLLAPSIBLE CORE ASSEMBLY FOR A MOLDING APPARATUS

This application is a continuation-in-part of U.S. Ser. No. 10/906,413, filed Feb. 18, 2005 now abandoned.

TECHNICAL FIELD OF THE INVENTION

This invention relates in general to part of an injection mold which produces parts requiring details such as internal threads, undercuts, protrusions, or cut-outs. Particularly, the present invention relates to collapsible cores that are configured to change from an expanded condition to mold an article on the core, to a collapsed condition that allows the article to be removed from the core.

BACKGROUND OF THE INVENTION

Collapsible cores have been manufactured for many years, as shown in U.S. Pat. No. 3,247,548. This patent discloses a collapsible core for molding threaded container caps. According to this patent, a one-piece core is longitudinally divided into a plurality of circumferentially disposed sections. The sections include inner and outer ribs that are formed into a common base. The sections are resilient in a radial direction and when radially unsupported are in a collapsed position. When a pin is inserted into a central channel of the sections, the sections are held in an expanded condition, used for molding. When molding is completed, the pin is withdrawn, and the sections collapse so that the cap can be removed.

The present inventor has recognized that the core as described in the aforementioned patent suffers the drawback that the core is expensive and difficult to manufacture. The present inventor has recognized that it would be desirable to provide collapsible core that was more cost effectively manufactured and more effectively operated.

SUMMARY OF THE INVENTION

The present invention provides a collapsible core device for molding articles around the core device in a mold cavity. The core device includes a first sleeve, a second sleeve and an expansion member. The first sleeve includes a plurality of first ribs extending from a first base in an axial direction and defining a discontinuous first perimeter surrounding a channel. The second sleeve includes a plurality of second ribs extending from a second base in an axial direction and defining a discontinuous second perimeter surrounding the central channel. Each of the second ribs is arranged between adjacent ones of the first ribs. The expansion member is fittable within the central channel to displace the first and second ribs outwardly to form an overall perimeter defined by the first and second ribs.

The first ribs can be tapered in a radially inward direction and the second ribs can be tapered in a radially outward direction and the overall perimeter can be a substantially continuous surface.

The overall perimeter can comprises a cylindrical surface with protruding threads, although other shapes and configurations are also encompassed by the invention.

At least some of the second ribs can comprise outside protuberances arranged around the second discontinuous perimeter. A collar can be provided surrounding the second discontinuous perimeter. The collar can have an inside surface for sliding over the protuberances to drive the second ribs inwardly to assist in removing a molded article from the core device.

The first base can be configured as a cap portion and the second base can be configured as a ring portion that is fittable into the cap portion.

Preferably, either or both the first and second ribs have a natural resiliency to a collapsed position wherein the first and/or the second discontinuous perimeter is smaller than the overall perimeter.

The invention provides a method of assembling a collapsible core device for molding articles around the core device in a mold cavity, comprising the steps of:

providing a first sleeve having a plurality of first ribs extending from a first base in an axial direction, said first ribs defining a discontinuous first perimeter surrounding a channel;

providing a second sleeve having a plurality of second ribs extending from a second base in an axial direction, said second ribs defining a discontinuous second perimeter surrounding the central channel;

inserting the second sleeve within the first sleeve to the extent that each of the second ribs is arranged between adjacent ones of the first ribs; and providing an expansion member configured to be forcibly fit within the central channel; and forcibly fitting the expansion member within the central channel to displace the first and second ribs outwardly to form an overall perimeter defined by the first and second ribs for molding an article around the overall perimeter.

Preferably, the first ribs are tapered in a radially inward direction and the second ribs are tapered in a radially outward direction and the overall perimeter is a substantially continuous surface, wherein the step of forcibly fitting causes the second ribs to forcibly wedge between adjacent first ribs.

Preferably, the step of providing the second sleeve is further defined in that at least some of the second ribs comprise outside protuberances arranged around the second discontinuous perimeter, and comprising the further step of providing a collar surrounding the second discontinuous perimeter, the collar including a surface for sliding over the protuberances to drive the second ribs inwardly.

Preferably the step of providing the first sleeve and the second sleeve are further defined in that the first base comprises a cap portion and the second base comprises a ring portion that is fittable into the cap portion, and the step of inserting the second sleeve within the first sleeve is further defined in that the ring portion fits into the cap portion when the second sleeve is inserted into the first sleeve.

Preferably, the step of providing the first sleeve and the second sleeve are further defined in that the second ribs have a natural resiliency to a collapsed position wherein the second discontinuous perimeter is smaller than the overall perimeter.

This preferred embodiment of the invention improves the manufacturability of the collapsible sections of molding apparatus. The invention greatly improves the accuracy during manufacture and reliability during use.

The preferred embodiment of the invention operates by removing the central pin and collapsing inwardly first the inner sleeve and then the outer sleeve, allowing the core sleeves to clear the protruding material, the molded part can then be ejected by other means not associated with this apparatus.

This invention does not require any rotational motion of the core device to remove a molded article.

The collapsible core is manufactured using two sleeves, one fit inside the other, which allows advanced manufacturing techniques resulting in improved quality and reliability.

The preferred embodiment provides a reduction in manufacturing cost compared to existing technologies. The preferred embodiment of the invention can be manufactured by modern technologies to precise tolerances. The preferred embodiment provides an improved fit within core components with reduced seam lines. The preferred embodiment provides shortened collapsible cores which reduces mold height. The preferred embodiment allows for standard, interchangeable size center pins and collars, eliminating the necessity of mating pins to manufactured cores. The use of separate inner and outer sleeves reduces manufacturing complexities compared to the prior art and allows for more precise manufacturing tolerances and interchangeable components. Spare parts costs are reduced. The preferred embodiment allows for standard replaceable components, such as the pins, collars and sleeves.

According to another aspect of the invention, the ability to use standardized parts allows the use of alternate pins, particularly a pin that can extend beyond the collapsible region of the core and an increased height of molded part detail on the core.

Numerous other advantages and features of the present invention will be become readily apparent from the following detailed description of the invention and the embodiments thereof, and from the accompanying drawings.

DESCRIPTION OF THE PREFERRED EMBODIMENTS

Figure 1:
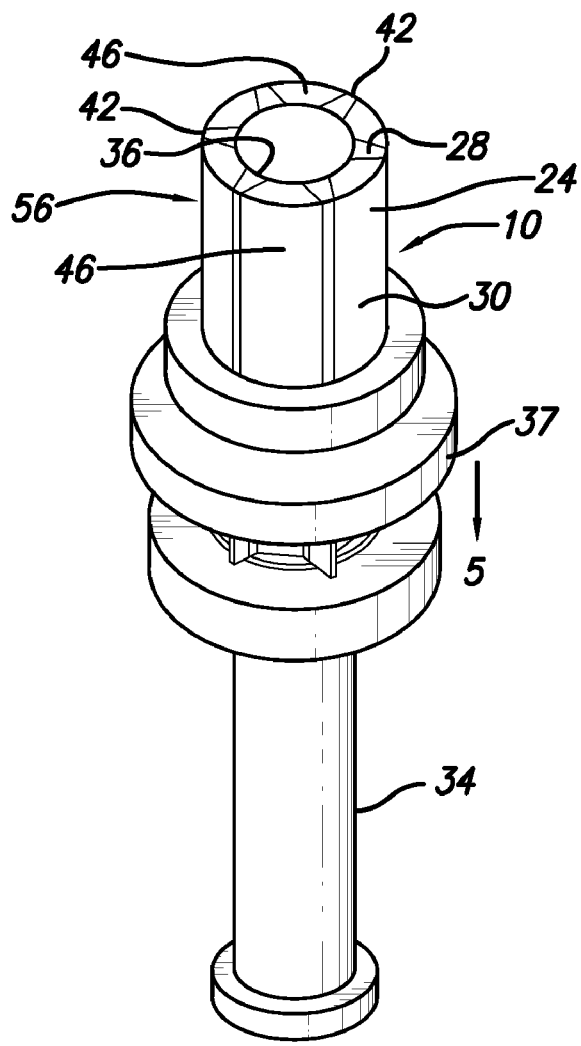
FIG. 1 is a perspective view of a core device of the present invention shown in a molding condition.

While this invention is susceptible of embodiment in many different forms, there are shown in the drawings, and will be described herein in detail, specific embodiments thereof with the understanding that the present disclosure is to be considered as an exemplification of the principles of the invention and is not intended to limit the invention to the specific embodiments illustrated.

FIGS. 1-8 illustrate a collapsible core device 10 in accordance with the present invention. The core 10 is used in conjunction with a female mold part 16 as shown schematically in FIG. 17.

The core device 10 includes a first, outer discontinuous sleeve 24, fit substantially within an outer perimeter 30 of the outer discontinuous sleeve 24. The second discontinuous sleeve 28 is fit within a central channel 32 of the outer discontinuous sleeve 24. A hollow pin 34 is fit within a central channel 36 of the inner discontinuous sleeve 28. A collar 37 surrounds the sleeves 24, 28.

The inner discontinuous sleeve 28 (FIGS. 9-12) includes ribs 42 that have a tapered thickness decreasing radially outward. The outer discontinuous sleeve 24 (FIGS. 13-16) includes ribs 46 that have a tapered thickness decreasing radially inward. The ribs 46 have gaps 50 between adjacent ribs 46 for receiving the ribs 42.

Figure 17:
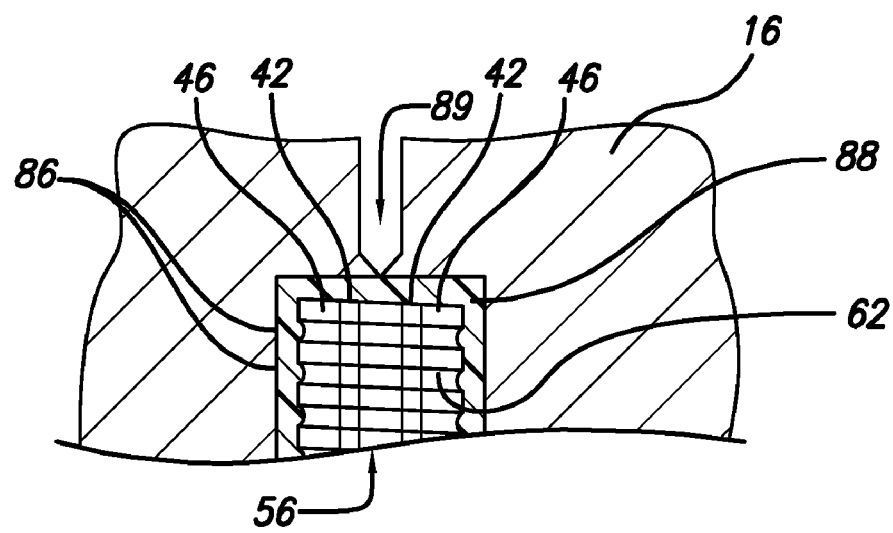
FIG. 17 is a fragmentary, schematical view of the assembly of FIG. 1 within a mold cavity.

FIGS. 1 and 3-5 illustrate the core device 10 in a molding condition. When the pin 34 is located tightly within the channel 36, the ribs 42 are forced into the gaps 50, and wedge therein between adjacent ribs 46. The ribs 42, 46, in the position shown in FIG. 1 form a continuous cylinder 56 which forms an outside cylindrical surface of an item being molded. Preferably grooves or threads 62 or other indentations or protrusions are cut or formed on an outside surface of the cylinder 56 as shown in FIG. 17. These protrusions form a concave or convex region on the article being molded.

FIGS. 2 and 6-8 illustrate a collapsed condition of the core device 10. The pin 34 has been retracted from the channel 36 in the direction R. The ribs 42 are formed to have an unstressed or natural position. The ribs 46 also have an unstressed or natural position. The ribs 42 collapse to a greater extent than the ribs 46 to allow for the overall collapsing of the cylinder 56.

FIGS. 9-12 illustrate the inner discontinuous cylinder 28 in more detail. The ribs 42 are formed into a base ring 66. The ribs 42 include a tapered bottom region 42a which allows for increase flexure of the ribs 42. At approximately a midway point along the length of each rib 42 is a protuberance 42b. The protuberance 42b works with the collar 37 to forcibly collapse the ribs 42 if necessary, as described below. The base ring 66 includes a hole 68 which can be threaded.

FIGS. 13-16 illustrate the outer discontinuous cylinder 24 in more detail. The ribs 46 include tapered bottom portions 46a. These tapered portions 46a allows for increased flexure of the ribs 46 to collapse the ribs 46 inwardly. The ribs 46 include protuberances 46b that work with the collar 37 to forcibly collapse the ribs 46 if necessary, as described below.

The ribs 46 are formed into a cap portion 76. The cap portion 76 includes an inside region 78 for receiving the base ring 66 of the inner discontinuous cylinder 28. The cap portion 76 has a hole 78 which can be used to pin or fasten the cap portion 76 to the base ring 66 at the hole 68 of the base ring 66.

Figure 2:
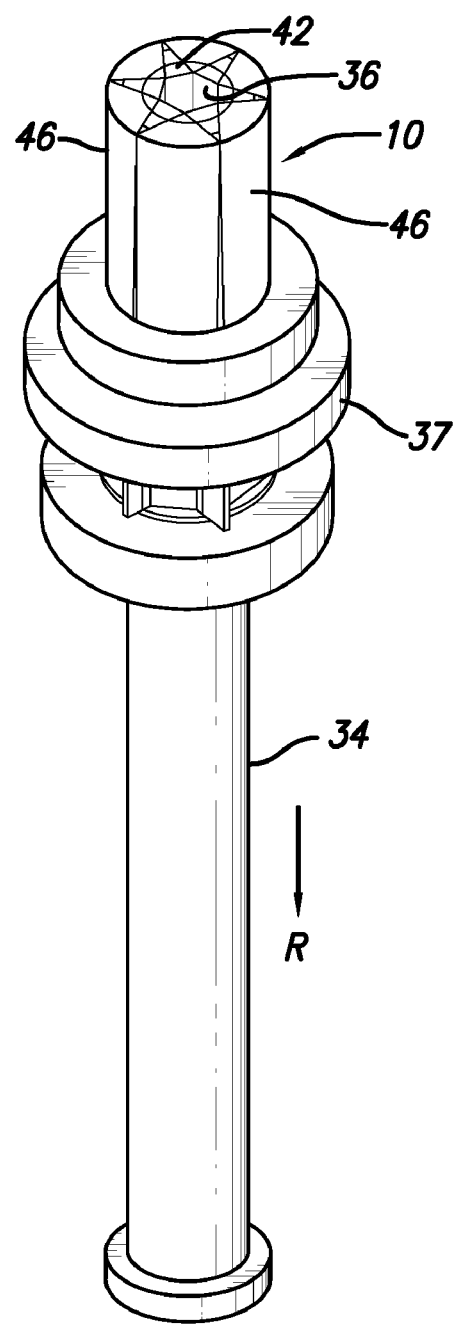
FIG. 2 is a perspective view of the core device of FIG. 1 shown in a collapsed condition.
Figure 3:
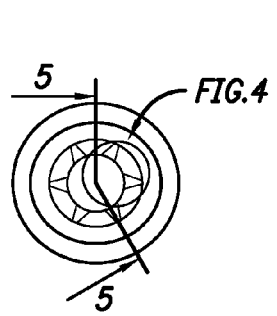
FIG. 3 is a top view of the assembly of FIG. 1.
Figure 4:
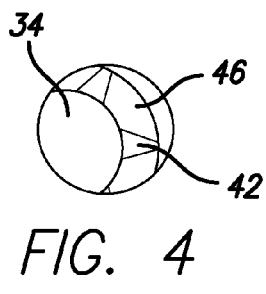
FIG. 4 is an enlarged view taken from FIG. 1 showing the inside and outside sleeves.
Figures 6, 7:
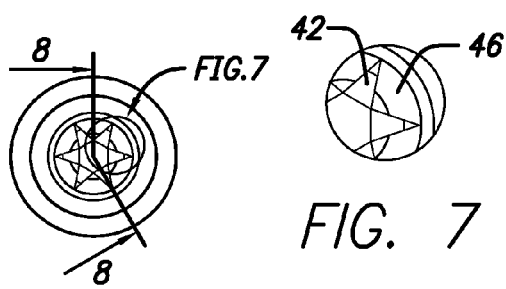
FIG. 6 is a top view of the assembly of FIG. 2.
FIG. 7 is an enlarged view taken from FIG. 4 showing the inside and out side sleeves.

FIG. 17 illustrates in schematic form a female mold 16 surrounding the cylinder portion 56 of the core device 10. Grooves or threads 62 are formed on an outside of the ribs 42, 46 to mold outside threads 86 inside a bottle cap 88. The bottle cap 88 is injection molded by plastic 89 injected into the mold 16. When the cap 88 has sufficiently cooled, the core cylinder 56 is collapsed as illustrated in FIG. 2. The cap 88 can then be removed axially from the cylinder 56 without stripping or distorting the threads 86 on the threads 62. Although groves 62 are shown formed on the core cylinder 56, alternatively ribs or other positive formations could be formed on the surface of the cylinder 56 to form negative impressions on the article being molded.

Figure 5:
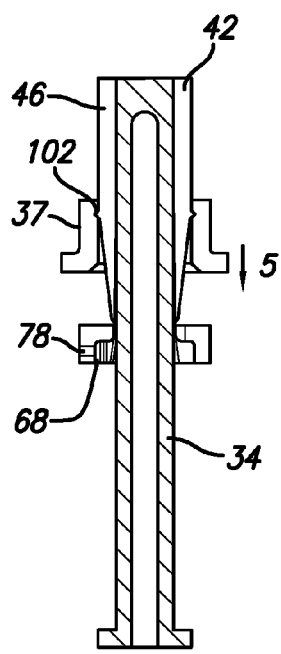
FIG. 5 is a sectional view taken generally along line 5-5 from FIG. 1 showing the assembly in molding position cut through both the inside and outside sleeves.
Figure 8:
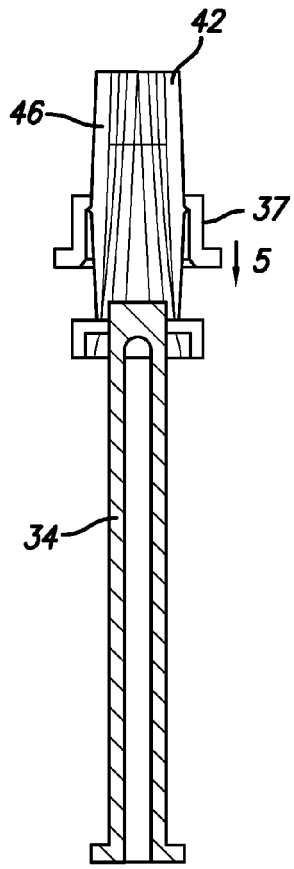
FIG. 8 is a sectional view taken generally along line 8-8 from FIG. 4 showing the assembly in collapsed position cut through both the inside and outside sleeves with the pin removed.
Figure 9:
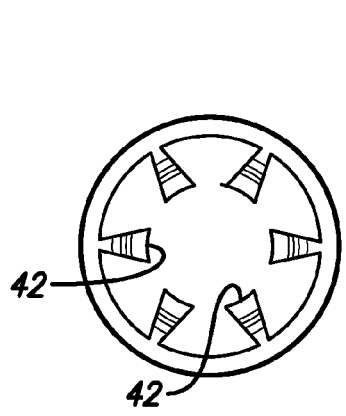
FIG. 9 is a top view of an inner sleeve taken from FIG. 1 in molding position.
Figure 10:
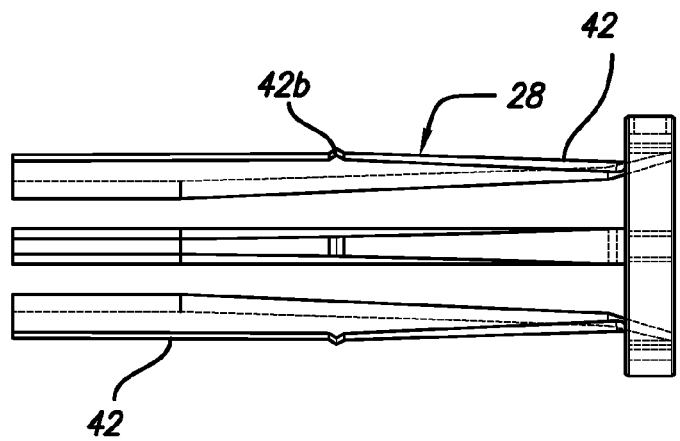
FIG. 10 is a right side view of the inner sleeve of FIG. 9 in molding position.
Figure 11:
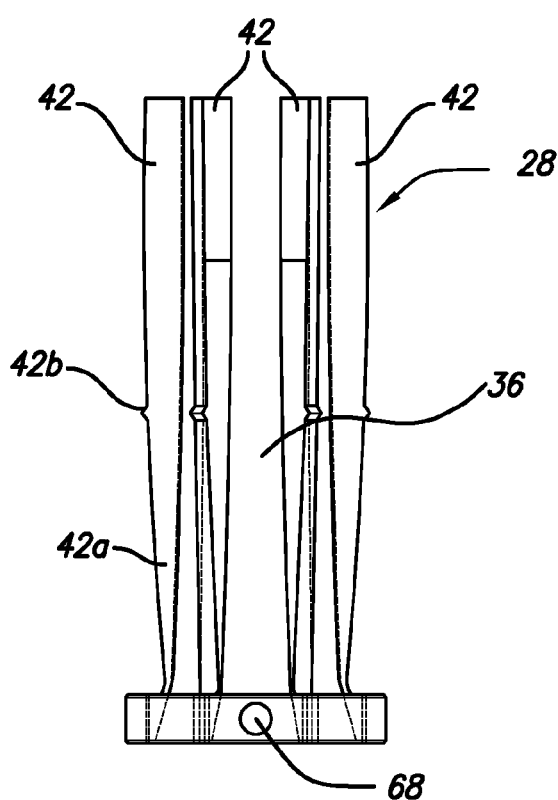
FIG. 11 is a front view of the inner sleeve of FIG. 9 in molding position.
Figure 12:
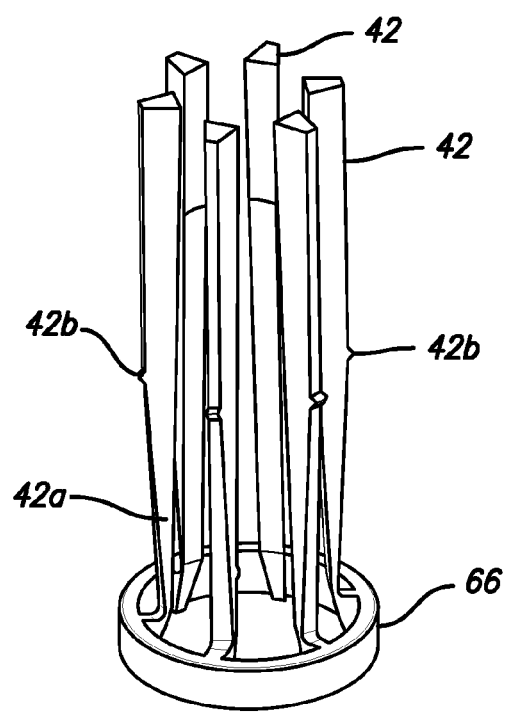
FIG. 12 is a perspective view of the inner sleeve of FIG. 9 in molding position.
Figure 13:
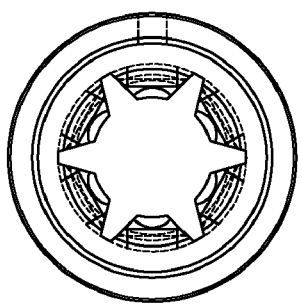
FIG. 13 is a top view of the outer sleeve taken from FIG. 1 in molding position.
Figure 14:
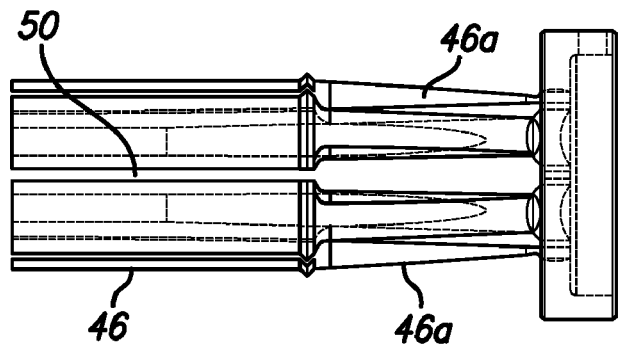
FIG. 14 is a right side view of the outer sleeve of FIG. 13 in molding position.
Figure 15:
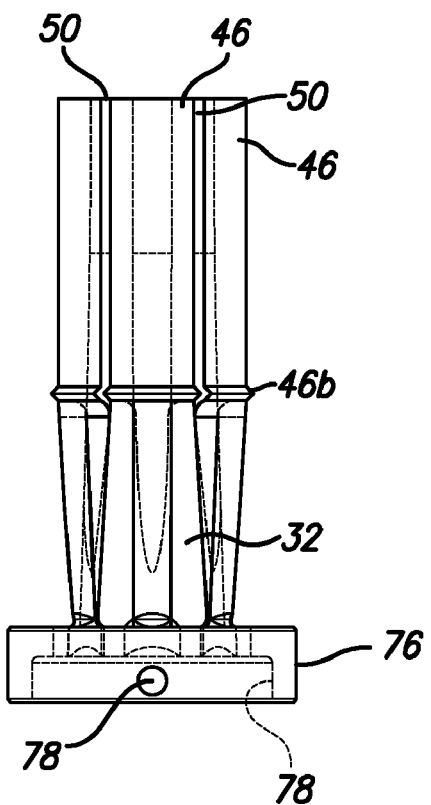
FIG. 15 is a front view of the outer sleeve of FIG. 13 in molding position.
Figure 16:
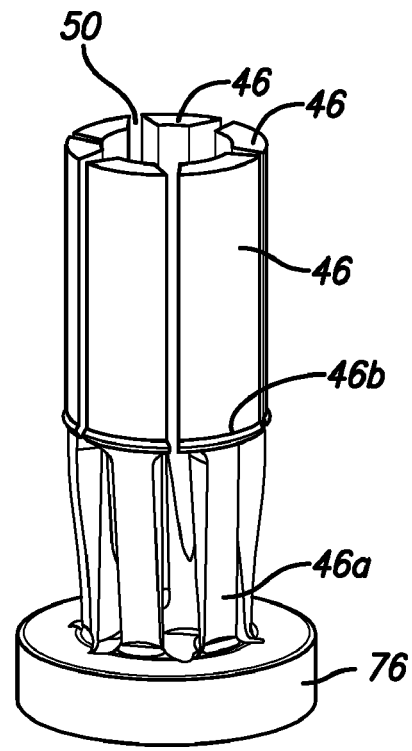
FIG. 16 is a perspective view of the outer sleeve of FIG. 13 in molding position.

The ribs 42, 46 have a natural resiliency to be urged into the collapsed configuration shown in FIGS. 2 and 6-8 once the pin 34 is retracted. However, it is possible that the collapse is prohibited by portions of cooled plastic. To overcome this problem, the collar 37 can be slid axially along the ribs 42, 46 in the direction S (FIGS. 1, 5). The collar 37 includes a tapered inside shoulder 102 that moves over the tapered protuberances 42b, 46b to drive the ribs 42, 46 into the collapsed state as the collar is moved along the direction S. The collar can be moved by a machine element (not shown) such as a lever or cam.

Figure 18:
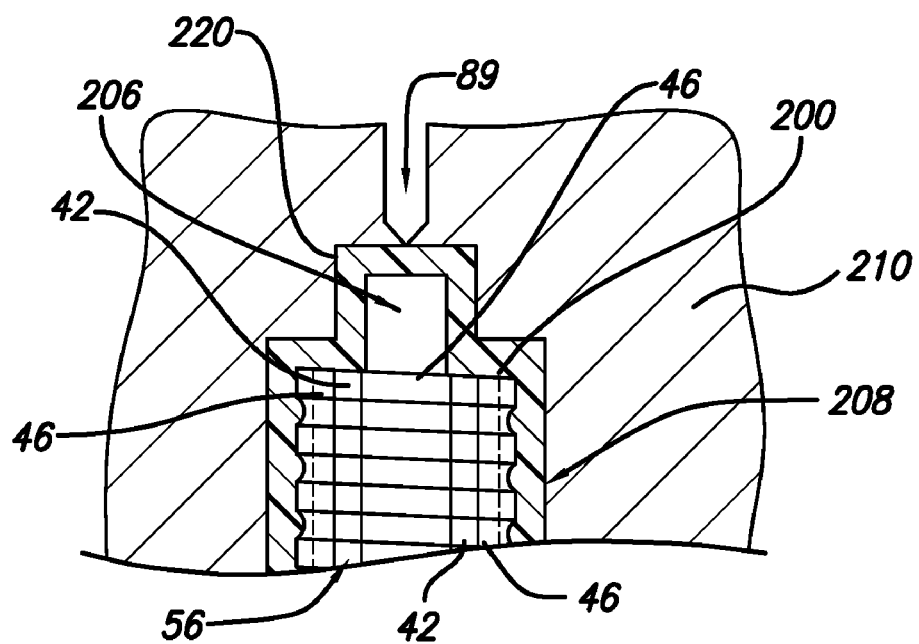
FIG. 18 is a fragmentary, schematical view of an alternate embodiment core device within a mold cavity.

FIG. 18 illustrates an alternate embodiment device 200 wherein a modified pin 206 is utilized. A modified article 208 such as a cap is formed within a modified female mold 210. This pin 206 includes a reduced diameter extension 212 that would be additive as compared to the pin 34 shown in FIG. 5. The extension 212, located above the collapsible cylinder 56 formed by the ribs 42, 46, is used as part of the molding core to mold a chamber 220 on top of a threaded portion 226 of the article 208. The extension 212 can have a variety of sizes and shapes and can be used for forming the chamber for providing a spout, a nozzle or other type dispensing configuration or mechanism, or support for such dispensing mechanisms.

The invention provides a method of assembling the collapsible core device 10. The outer sleeve 24 is formed by cutting a cylindrical stock piece to form separate ribs 46. The ribs 46 are then bent and deformed inwardly to set a natural, unstressed collapsed condition. The inner sleeve 28 is formed in identical fashion. The sleeves are preferably formed of A2 Steel or 420 stainless steel, or other materials compatible with the molding process. If fact, since according to the invention, the sleeves 24, 28 are separately formed components, different materials, or material hardnesses, could be used for each sleeve. The grooves 62 (FIG. 17) can be formed at this stage or possible at an earlier stage. If protrusions are to be formed outside the cylinder, these can be formed before the ribs are cut.

The second sleeve 28 is inserted into the first sleeve to the extent that each of said inner ribs 42 is arranged between adjacent ones of the outer ribs 46.

An expansion member, such as the hollow pin 34 is then forcibly fit within the central channel 36 to displace first the inner ribs 42 into the outer ribs 46 and then both inner and outer ribs outwardly, wedging the inner and outer ribs together, to form an overall perimeter defined by said ribs for molding an article around said overall perimeter.

From the foregoing, it will be observed that numerous variations and modifications may be effected without departing from the spirit and scope of the invention. It is to be understood that no limitation with respect to the specific apparatus illustrated herein is intended or should be inferred.

The invention claimed is:

1. A method of assembling a collapsible core device for molding articles around said core device in a mold cavity, comprising:

providing a first sleeve having a plurality of first ribs extending from a first base in an axial direction, said first ribs defining a discontinuous first perimeter surrounding a central channel, said first base having an annular shoulder portion defining a portion of said central channel and said annular shoulder portion having a plurality of grooves extending therethrough;

providing a second sleeve having a plurality of second ribs extending from a second base in an axial direction, said second ribs defining a discontinuous second perimeter surrounding said central channel;

inserting said second sleeve within said first sleeve to the extent that each of said second ribs is arranged between adjacent ones of said first ribs and that at least a portion of at least one of said second ribs extends through at least one of said plurality of grooves of said annular shoulder portion of said first base;

and providing an expansion member configured to be forcibly fit within said central channel; forcibly fitting said expansion member within said central channel to displace said first and second ribs outwardly to form an overall perimeter defined by said first and second ribs for molding an article around said overall perimeter.

2. The method according to claim 1, wherein said first ribs are tapered in a radially inward direction and said second ribs are tapered in a radially outward direction and said overall perimeter is a substantially continuous surface, wherein said step of forcibly fitting causes said second ribs to forcibly wedge between adjacent first ribs.

3. The method according to claim 2, wherein said overall perimeter comprises a cylindrical surface with protruding threads.

4. The method according to claim 3, wherein said step of providing said second sleeve is further defined in that at least some of said second ribs comprise outside protuberances arranged around said second discontinuous perimeter, and comprising the further step of providing a collar surrounding said second discontinuous perimeter, said collar including a surface for sliding over said protuberances to drive said second ribs inwardly.

5. The method according to claim 2, wherein said step of providing said second sleeve is further defined in that at least some of said second ribs comprise outside protuberances arranged around said second discontinuous perimeter, and comprising the further step of providing a collar surrounding said second discontinuous perimeter, said collar including a surface for sliding over said protuberances to drive said second ribs inwardly.

6. The method according to claim 1, wherein said step of providing said second sleeve is further defined in that at least some of said second ribs comprise outside protuberances arranged around said second discontinuous perimeter, and comprising the further step of providing a collar surrounding said second discontinuous perimeter, said collar including a surface for sliding over said protuberances to drive said second ribs inwardly.

7. The method according to claim 1, wherein said steps of providing said first sleeve and said second sleeve are further defined in that said first base comprises a cap portion and said second base comprises a ring portion that is fittable into said cap portion, and said step of inserting said second sleeve within said first sleeve is further defined in that said ring portion fits into said cap portion when said second sleeve is inserted into said first sleeve.

8. The method according to claim 7, wherein said steps of providing said first sleeve and said second sleeve are further defined in that said second ribs have a natural resiliency to a collapsed position wherein said second discontinuous perimeter is smaller than said overall perimeter.

9. The method according to claim 7, wherein said step of providing said second sleeve is further defined in that said ring portion of the second base includes an inner annular surface defining a portion of the central channel and said second ribs initially extend radially inwardly from the inner annular surface of the ring portion toward the central channel before extending axially from said second base.

10. The method according to claim 7, wherein said step of providing said first sleeve is further defined in that said annular shoulder of said first base is defined as the transition between the annular inner portion of said cap adjacent to said central channel and said axially extending first ribs.

11. The method according to claim 10, wherein said step of providing said first sleeve is further defined in that said first ribs extend radially inwardly toward the central channel at said annular shoulder toward the central channel before extending substantially axially from said first base.

12. The method according to claim 1, wherein said steps of providing said first sleeve and said second sleeve are further defined in that said second ribs have a natural resiliency to a collapsed position wherein said second discontinuous perimeter is smaller than said overall perimeter.

13. The method according to claim 1, wherein said step of providing said first sleeve is further defined in that the shoulder portion of the first base defines a transition between said plurality of first ribs and said first base.

14. The method according to claim 13, wherein said step of providing said first sleeve is further defined in that the annular shoulder includes an exterior surface and said plurality of grooves of said annular shoulder extend from the exterior surface of said annular shoulder through to said central channel.

15. The method according to claim 13, wherein step of providing said second sleeve is further defined in that each of said second ribs include an exterior surface portion dimensioned to be received by at least one of said plurality of grooves of said annular shoulder.

* * * * *

(12) EX PARTE REEXAMINATION CERTIFICATE (7192nd)
United States Patent
Zydron

(10) Number: US 7,293,341 C1
(45) Certificate Issued: Nov. 24, 2009

(54) COLLAPSIBLE CORE ASSEMBLY FOR A MOLDING APPARATUS

(75) Inventor: Garry Zydron, Romeoville, IL (US)

(73) Assignee: Progressive Components International Corporation, Wauconda, IL (US)

Reexamination Request:
No. 90/008,921, May 6, 2008

Reexamination Certificate for:
Patent No.: 7,293,341
Issued: Nov. 13, 2007
Appl. No.: 11/143,528
Filed: Jun. 2, 2005

Related U.S. Application Data

(63) Continuation-in-part of application No. 10/906,413, filed on Feb. 18, 2005, now abandoned.

(51) Int. Cl.
*B23P 11/02* (2006.01)
*B21D 39/00* (2006.01)

(52) U.S. Cl. .............. 29/450; 29/522.1; 425/438; 425/577

(58) Field of Classification Search ............ None
See application file for complete search history.

(56) References Cited

U.S. PATENT DOCUMENTS

| | | |
|---|---|---|
| 3,247,548 A | 5/1962 | Fields |
| 4,019,711 A | 4/1977 | Altenhof |
| 4,286,766 A | 9/1981 | von Holdt |
| 4,533,312 A | 8/1985 | Von Holdt |
| 4,627,810 A | 12/1986 | Von Holdt |
| 4,723,430 A | 2/1988 | Hahn |
| 4,861,257 A | 8/1989 | Siotani |
| 5,403,179 A | 4/1995 | Ramsey |

*Primary Examiner*—Jeffrey L. Gellner

(57) ABSTRACT

A collapsible core device for molding articles around the core device in a mold cavity includes a first sleeve, a second sleeve and an expansion member. The first sleeve includes a plurality of first ribs extending from a first base in an axial direction and defining a discontinuous first perimeter surrounding a channel. The second sleeve includes a plurality of second ribs extending from a second base in an axial direction and defining a discontinuous second perimeter surrounding the central channel. Each of the second ribs is arranged between adjacent ones of the first ribs. The expansion member is fittable within the central channel to displace the first and second ribs outwardly to form an overall perimeter defined by the first and second ribs.

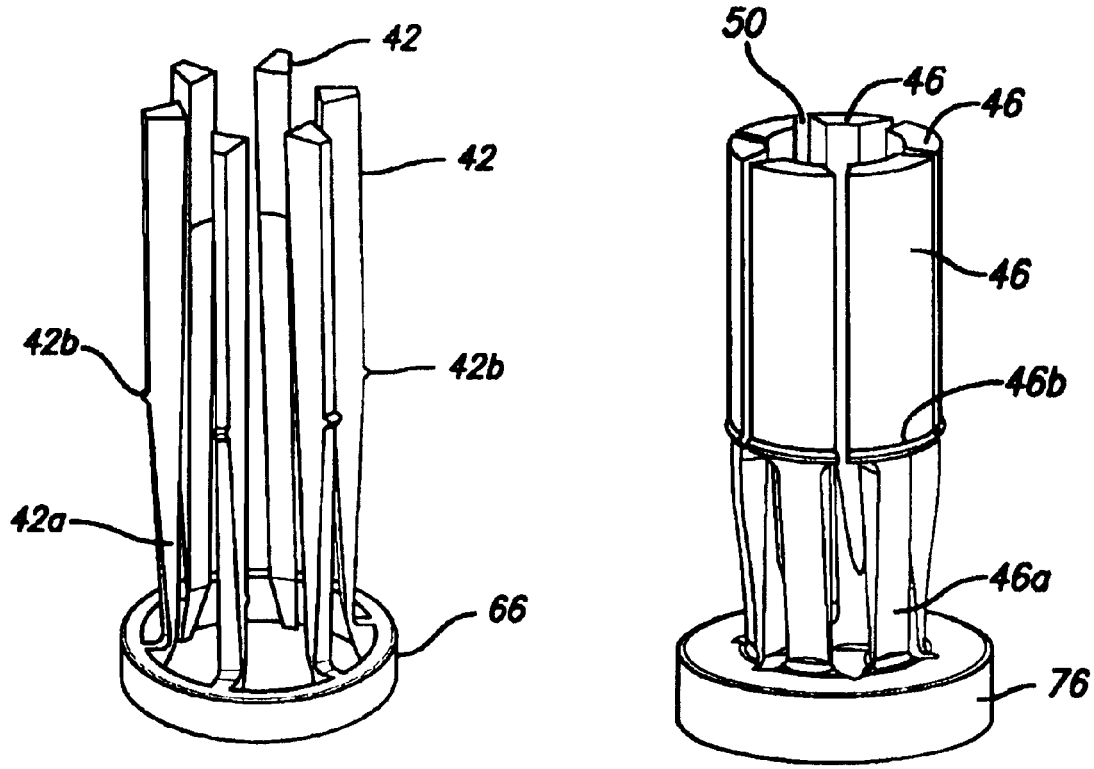

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 4–11 is confirmed.

Claims 1–3 and 12–15 are cancelled.

\* \* \* \* \*